US012260316B2

United States Patent
Datta et al.

(10) Patent No.: US 12,260,316 B2
(45) Date of Patent: Mar. 25, 2025

(54) AUTOMATIC TIMING RESOLUTION AMONG NEURAL NETWORK COMPONENTS

(71) Applicant: International Business Machines Corporation, Armonk, NY (US)

(72) Inventors: Pallab Datta, San Jose, CA (US); Myron D. Flickner, San Jose, CA (US); Dharmendra S. Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1435 days.

(21) Appl. No.: 15/709,699

(22) Filed: Sep. 20, 2017

(65) Prior Publication Data

US 2019/0087714 A1 Mar. 21, 2019

(51) Int. Cl.
*G06N 3/063* (2023.01)
*G06N 3/049* (2023.01)

(52) U.S. Cl.
CPC ............. *G06N 3/063* (2013.01); *G06N 3/049* (2013.01)

(58) Field of Classification Search
CPC ......... G06F 13/36; G06N 3/063; G06N 3/049
See application file for complete search history.

(56) References Cited

U.S. PATENT DOCUMENTS

| | | | | |
|---|---|---|---|---|
| 5,796,621 A * | 8/1998 | Dudley | ............... | G06F 30/3312 716/108 |
| 5,937,202 A * | 8/1999 | Crosetto | ............... | G06F 15/803 712/11 |
| 6,324,586 B1 * | 11/2001 | Johnson | ................... | G04G 7/02 342/356 |
| 8,555,220 B2 * | 10/2013 | Kocan | ..................... | G06F 30/33 716/108 |
| 9,152,737 B1 * | 10/2015 | Micali | ..................... | G05B 15/02 |
| 9,182,949 B2 * | 11/2015 | Eksten | ..................... | G06F 8/60 |
| 10,970,630 B1 * | 4/2021 | Aimone | ................... | G06N 3/04 |
| 2004/0170443 A1 * | 9/2004 | Maeshima | ............. | G03G 15/50 399/82 |
| 2004/0267977 A1 * | 12/2004 | Sriram | ................... | G06F 30/394 710/10 |
| 2012/0311514 A1 * | 12/2012 | Lavin | .................. | G06F 30/3323 716/108 |
| 2013/0046716 A1 * | 2/2013 | Chan | ...................... | G06N 3/049 706/18 |
| 2013/0297542 A1 * | 11/2013 | Piekniewski | .......... | G06N 3/049 706/27 |

(Continued)

OTHER PUBLICATIONS

Topological Sorting of Large Networks: Kahn Communications of the ACM, vol. 5, Issue 11, Nov. 1962, pp. 558-562.*

(Continued)

*Primary Examiner* — Li Wu Chang
(74) *Attorney, Agent, or Firm* — Stosch Sabo

(57) ABSTRACT

A neural network may include a set of components. The set of components may have timing requirements and a topological order. The relative timing of each component may be computed and the dependencies of the set of components may be enumerated. Mutable components within the set of components may be identified, and the relative timing of the mutable components may be adjusted to satisfy the timing requirements of each component in the set of components.

20 Claims, 5 Drawing Sheets

(56) References Cited

U.S. PATENT DOCUMENTS

| | | | | |
|---|---|---|---|---|
| 2014/0007043 | A1* | 1/2014 | Aliseychik | G06F 8/70 |
| | | | | 717/106 |
| 2014/0143193 | A1* | 5/2014 | Zheng | G06N 3/049 |
| | | | | 706/25 |
| 2015/0081607 | A1* | 3/2015 | Hunzinger | G06N 3/049 |
| | | | | 706/26 |
| 2016/0125289 | A1* | 5/2016 | Amir | G06N 3/063 |
| | | | | 706/27 |
| 2016/0283840 | A1 | 9/2016 | Amir et al. | |
| 2016/0364519 | A1* | 12/2016 | Allen | G01R 31/31725 |
| 2017/0017876 | A1 | 1/2017 | Modha | |
| 2017/0235848 | A1* | 8/2017 | Van Dusen | G06F 16/904 |
| | | | | 705/12 |

OTHER PUBLICATIONS

Crichlow, "An Introduction to Distributed and Parallel Computing", 1988, Prentice Hall International (Year: 1988).*

Kahn "Topological sorting of large networks", Communications of the ACM, vol. 5, Issue 11, Nov. 1962, pp. 558-562, doi: 10.1145/368996.369025.

* cited by examiner

AUTOMATIC TIMING RESOLUTION AMONG NEURAL NETWORK COMPONENTS

BACKGROUND

The present disclosure relates generally to the field of neural networks, and more particularly to timing resolution among components of neural networks.

Neural networks may contain multiple nodes/components organized in hierarchical fashion. A particular component may contain a neurosynaptic program that encapsulates a network of neurosynaptic cores. Each component may be designed by an independent creator and have its own independent properties, including timing requirements. Resolving the timing requirements of a neural network becomes increasingly difficult as the number of components increases and/or with the complexity of the arrangement of the components.

SUMMARY

Embodiments of the present disclosure include a method, computer program product, and system for resolving timing requirements among components of a neural network. A set of components to be included in a neural network are identified. The timing requirements of each component are determined. The topological order of the set of components is computed. The relative timing of each component is computed. The dependencies of the set of components are enumerated. A subset of mutable components is identified from the set of components. The relative timing of one or more mutable components is adjusted to satisfy the timing requirements of each component in the set of components.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
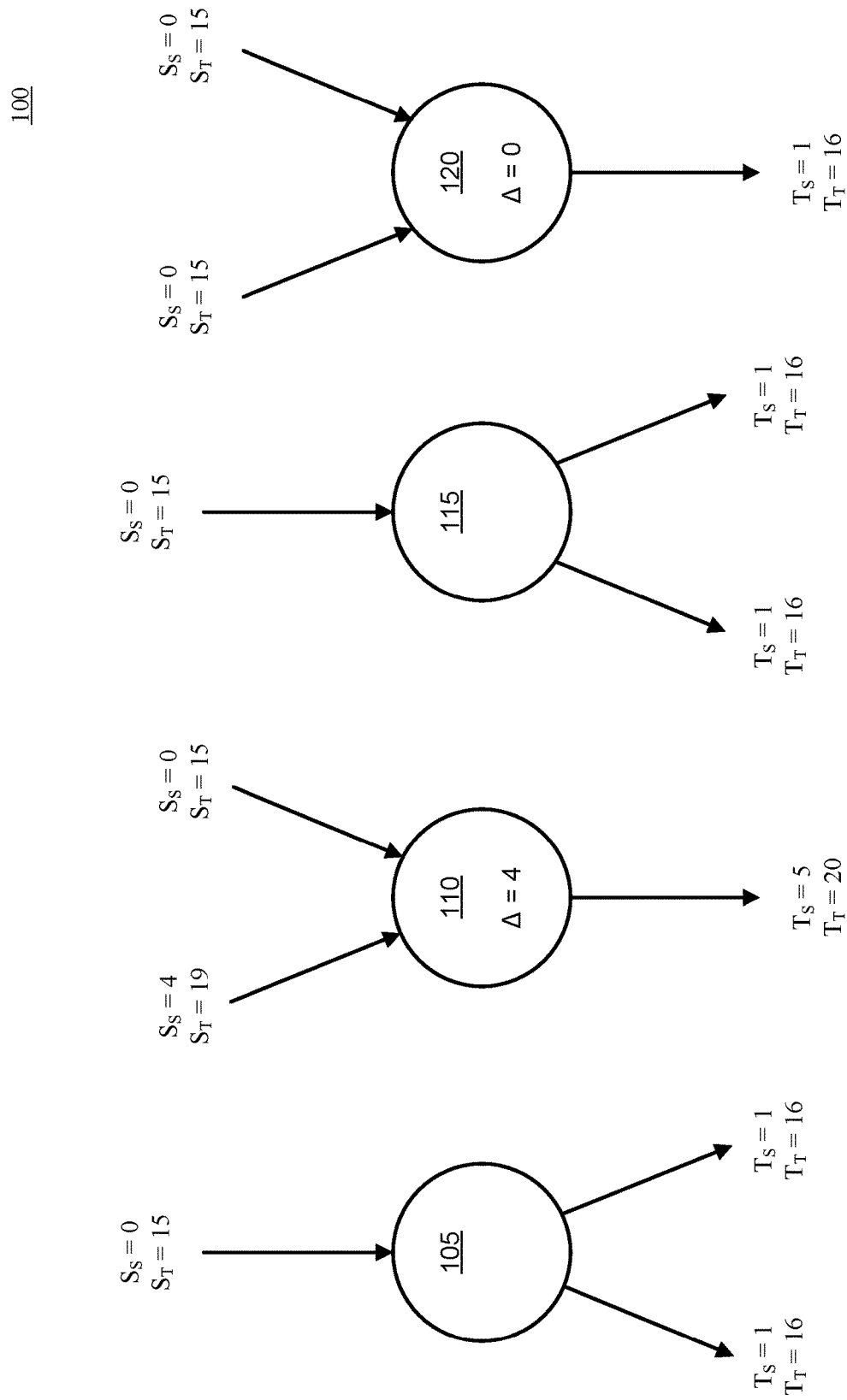
FIG. 1 illustrates a set of neural network components, each having its own timing requirements, in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of neural networks, and more particularly to timing resolution among components of neural networks. While the present disclosure is not necessarily limited to such applications, various aspects of the disclosure may be appreciated through a discussion of various examples using this context.

Neural networks may be comprised of any number of components. Components of a neural network may include, for example, modules, nodes, multi-layer perceptrons (MLPs), sigmoid neurons, cores, corelets, etc. Components of a neural network may include an arrangement of logic gates, or virtualizations of logic gates. A directed acyclic graph (DAG) may be used to map the associations/connections among the components of a neural network to build a comprehensive neurosynaptic system that includes a plurality of neural networks and/or neural network components. In embodiments, a DAG topology (e.g., a structural map of all or a part of the comprehensive neurosynaptic system) may be computed according to Kahn's Algorithm, which is well-known in the art. Kahn's Algorithm has a complexity of $O(v+e)$, where v is the total number of vertices in the DAG and e is the total number of edges in the graph. In the present disclosure, v may correspond to the neural network components, and e may correspond to the edges between the output connector of one neural network component and the input connector of another neural network component.

Individual components may be designed by one or more individuals, and therefore each component may have its own independent properties, including timing properties, dependency specifications, and other requirements. As the number of neural network components increases, resolving the timing requirements for all the components becomes exponentially more difficult and time consuming for a neural network architect/administrator. It is possible that an administrator may include unnecessary delay components to satisfy timing requirements, thereby increasing the overall number of components, which can lead to unnecessary complexity and difficulty in debugging.

The present disclosure provides a method/solution for automated resolution of the timing requirements of the set of components (e.g., logic gate groups, modules, nodes, multi-layer perceptrons (MLPs), sigmoid neurons, cores, corelets, etc.) included in a neural network that can not only save time and effort in building a comprehensive neurosynaptic system, but it can also improve the functioning (and the efficiency of any debugging efforts) of the neurosynaptic system itself by preventing the inclusion of unnecessary delay components and providing a systematic method for timing resolution that can be followed and checked.

A given set of neural network components may have attributes/properties, such as timing dependencies (e.g., relative timing requirements between local inputs incident on the same component). Once a DAG has been computed (e.g., by using Kahn's Algorithm), the timing dependencies between individual edges (e.g., connections between neural network components) may be specified by a user. Embodiments of the present disclosure may adjust the relative timing of each individual component's inputs/outputs as the system is composed, such that the specified or desired timing dependencies (e.g., the timing requirements) of the neurosynaptic system are satisfied.

Adjusting the relative timing of each individual component's inputs/outputs may first require enumerating through the dependencies of the DAG. In other words, the position of any dependencies must be identified and the type of dependency determined (e.g., whether the dependency is a single dependency between two inputs, or a multiple dependency between three or more inputs).

In embodiments, it may be determined that the timing requirements may only be satisfied when a particular component's relative timing is adjusted beyond a maximum restriction (e.g., a limit in the maximum delay the component can manifest). In such cases, delay components (e.g., components that may serve to further delay a signal as it traverses a neurosynaptic system) may be incorporated to satisfy the timing requirements. Delay components may also be referred to as timing components.

It may be possible that adjusting relative timing and employing one or more delay components may not satisfy timing requirements. Embodiments of the present disclosure may notify a user if a feasible solution is not possible to resolve a neurosynaptic system's timing requirements for a given set of components and their associated DAG, given the timing dependencies specified by the user(s).

As discussed above, aspects of the disclosure may relate to field of neural networks, and more particularly to timing resolution among components of neural networks. Accordingly, an understanding of the embodiments of the present disclosure may be aided by describing embodiments of neural networks and DAGs, and the environment in which these systems may operate.

Turning now to the figures, FIG. 1 illustrates a set of neural network components 100, each having its own timing requirements, in which illustrative embodiments of the present disclosure may be implemented.

The set of neural network components 100 may include for example, modules, nodes, multi-layer perceptrons (MLPs), sigmoid neurons, neurosynaptic cores, corelets, vertices, etc. Components of a neural network may include an arrangement of logic gates, or virtualizations of logic gates. Neural network components 105-120 may be designed by one or more individuals, and each component may have its own independent properties, including timing properties and requirements (e.g., values for $\Delta$, $S_S$, $S_T$, $T_S$, $T_T$ (described below) may be dictated by the designers of the particular component). A neurosynaptic system may include one or more neural networks comprising two or more neural network components; the four components depicted are for illustrative purposes and are not meant to limit the disclosure in any way.

For example, neural network component 105 is depicted as a neural network component with a single input and two outputs, where the incoming edge of the neural network component has a source start time ($S_S$) of 0 (e.g., an initial input is received starting at "tick" zero of the neurosynaptic system's clock), a source end time ($S_T$) of 15 (e.g., the last/terminal input of a signal is received at "tick" 15), a target start time ($T_S$) of one (e.g., the first output is generated at "tick" one), and a target end time ($T_T$) of 16 (e.g., the last output is generated at "tick" 16). In this illustration, $T_S$ and $T_T$ for the second output are identical to the first output. In this illustration, the processing time for each neural network component 105-120 is $N_P=1$ (e.g., the time it takes for a neural network component to process an input and converted it to an output is one "tick"). Neural network component 105 is illustrated with a single input, and therefore there is no competing input to resolve. As such, no timing dependency exists, so there is no value for $\Delta$. $\Delta=0$ may be used to describe a neural network component with multiple inputs that are in sync (e.g., a neural network component with multiple inputs that are to be received simultaneously). $\Delta=X$, where X is a positive integer, may be used to describe a dependency specification; a neural network component with multiple inputs where one input must be received starting at X "ticks" prior to another input.

Neural network component 110 is depicted as a component with two inputs and a single output. The first input has a source start time ($S_S$) of 4 and a source end time ($S_T$) of 19, and the second input has a source start time ($S_S$) of 0 and a source end time ($S_T$) of 15. The timing dependency (e.g., the difference between the earliest input ($S_S=0$ of the second input) and the latest input ($S_S=4$ of the first input)) is illustrated by $\Delta=4$. $N_P=1$ in this illustration, therefore the output's target start and target end times will be $T_S=5$ and $T_T=20$, respectively.

Neural network component 115 is depicted as a component with a single input with attributes $S_S=0$ and $S_T=15$, and two outputs, each with attributes $T_S=1$ and $T_T=16$. There is no value for $\Delta$ (e.g., there is a single input, therefore there is no timing dependency).

Neural network component 120 is depicted with two inputs, each having attributes $S_S=0$ and $S_T=15$, and a single output having attributes $T_S=1$ and $T_T=0$. $\Delta=0$ here, because the component inputs are to be received simultaneously.

The neural network components 105-120 may be represented using code substantially similar to:

```
{
  /* General Component and MATLAB module parameters */
  "MODULES":{
    "OBJ": {
      "moduleClass": "Component",
      "Object": "Component105",
      "processingTime": 1,
      "mutable": "true"
    },
    "OBJ": {
      "moduleClass": "Component",
      "Object": "Component110",
      "processingTime": 1,
      "mutable": "true"
    },
    "OBJ": {
      "moduleClass": "Component",
      "Object": "Component115",
      "processingTime": 1,
      "mutable": "true"
    },
    "OBJ": {
      "moduleClass": "Component",
      "Object": "Component120",
      "processingTime": 1,
      "mutable": "true"
    }
  }
}
```

In embodiments, neural network components 105-120 may be combined into a DAG to form a graphical representation of a neurosynaptic system, or a portion thereof.

Figure 2:
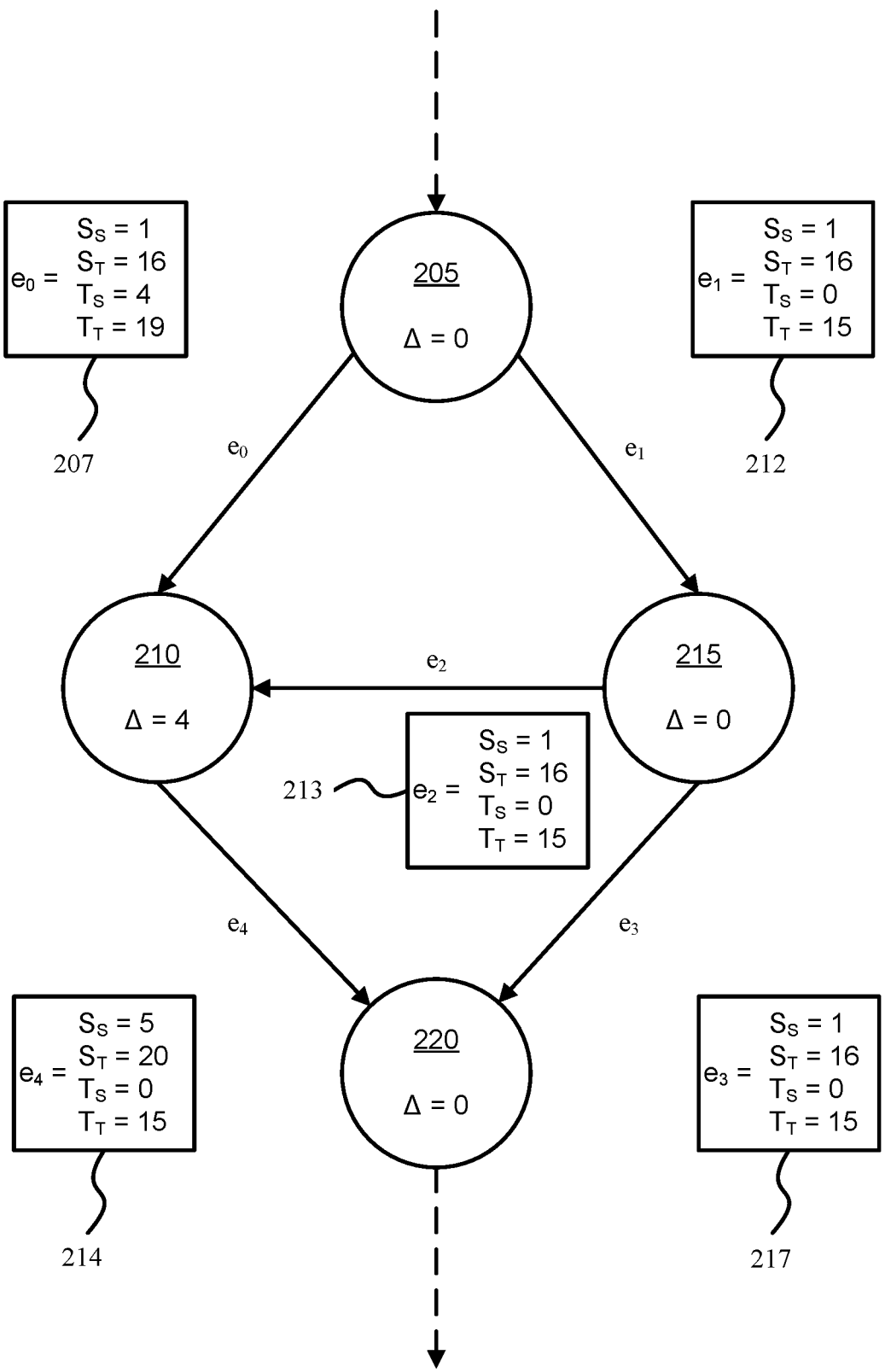
FIG. 2 illustrates a diagram of a directed acyclic graph of a set of neural network components, in accordance with embodiments of the present disclosure.

Turning now to FIG. 2, illustrated is a diagram of a directed acyclic graph 200 of a set of neural network components, in accordance with embodiments of the present disclosure. The initial source start time and source end time and target start time and end time (e.g., $S_S$, $S_T$, $T_S$ and $T_T$, respectively) of every edge (e.g., $e_0$, $e_1$, $e_2$, $e_3$, $e_4$) may be computed by combining the start time and end time of the output of one component and input to another component.

In the present figure, the DAG 200 includes neural network components 205, 210, 215, and 220. For illustrative purposes, components 205, 210, 215, and 220 may be substantially similar to (e.g., have identical values for $S_S$, $S_T$, $T_S$, $T_T$, A, and $N_P$) as components 105, 110, 115, and 120 of FIG. 1, respectively.

As stated above, variables $S_S$, $S_T$, $T_S$ and $T_T$ of every edge (e.g., $e_0$, $e_1$, $e_2$, $e_3$, $e_4$) may be computed by combining the start time and end time of the output of one component and input to another component. For example, edge $e_0$ transports the output of component 205 to become an input of component 210. Neural network component 205's target side attributes are $T_S$=1 and $T_S$=16, and neural network component 210's source side attributes (for the first input described for component 110 of FIG. 1) are $S_S$=4 and $S_T$=19. Therefore, the attributes of edge $e_1$ (illustrated in 207) are $S_S$=1 (e.g., the target start time of component 205), $S_T$=16 (e.g., the target end time of component 205), $T_S$=4 (e.g., the source start time of component 210), and $T_T$=19 (e.g., the source end time of component 210).

Similarly, edge $e_1$ transports the output of component 205 to become the input of component 215. Neural network component 205's target side attributes are $T_S$=1 and $T_S$=16, and neural network component 215's source side attributes are $S_S$=0 and $S_T$=15. Therefore, the attributes of edge $e_1$ (illustrated in 212) are $S_S$=1 (e.g., the target start time of component 205), $S_T$=16 (e.g., the target end time of component 205), $T_S$=0 (e.g., the source start time of component 215), and $T_T$=15 (e.g., the source end time of component 215).

Similarly, edge $e_2$ transports the output of component 215 to become an input of component 210. Neural network component 215's target side attributes are $T_S$=1 and $T_S$=16, and neural network component 210's source side attributes (for the second input described for component 110 of FIG. 1) are $S_S$=0 and $S_T$=15. Therefore, the attributes of edge $e_2$ (illustrated in 213) are $S_S$=1 (e.g., the target start time of component 215), $S_T$=16 (e.g., the target end time of component 215), $T_S$=0 (e.g., the source start time of component 210), and $T_T$=15 (e.g., the source end time of component 210).

Similarly, edge $e_3$ transports the output of component 215 to become an input of component 220. Neural network component 215's target side attributes are $T_S$=1 and $T_S$=16, and neural network component 220's source side attributes are $S_S$=0 and $S_T$=15. Therefore, the attributes of edge $e_3$ (illustrated in 217) are $S_S$=1 (e.g., the target start time of component 215), $S_T$=16 (e.g., the target end time of component 215), $T_S$=0 (e.g., the source start time of component 220), and $T_T$=15 (e.g., the source end time of component 220).

Similarly, edge $e_4$ transports the output of component 210 to become an input of component 220. Neural network component 210's target side attributes are $T_S$=5 and $T_S$=20, and neural network component 220's source side attributes are $S_S$=0 and $S_T$=15. Therefore, the attributes of edge $e_4$ (illustrated in 214) are $S_S$=5 (e.g., the target start time of component 210), $S_T$=20 (e.g., the target end time of component 210), $T_S$=0 (e.g., the source start time of component 220), and $T_T$=15 (e.g., the source end time of component 220).

The edges $e_0$-$e_4$ and the two dependencies in the DAG (e.g., the dependency at component 210 and the dependency at component 220) may be represented using code substantially similar to:

```
{
/*Edges in the graph */
"EDGES":{
  "EDGE": {
    "id": 0,
    "sourceModule": "Component205",
    "targetModule": "Component210",
    "initialsrcStartTime": 1,
    "initialsrcEndTime": 16,
    "initialtgtStartTime": 4,
    "initialtgtEndTime": 19,
    "resolvedsrcStartTime": -1,
    "resolvedsrcEndTime":-1,
    "resolvedtgtStartTime": -1,
    "resolvedtgtEndTime":-1
  },
  "EDGE": {
    "id": 1,
    "sourceModule": "Component205",
    "targetModule": "Component215",
    "initialsrcStartTime": 1,
    "initialsrcEndTime": 16,
    "initialtgtStartTime": 0,
    "initialtgtEndTime": 15,
    "resolvedsrcStartTime": -1,
    "resolvedsrcEndTime":-1,
    "resolvedtgtStartTime": -1,
    "resolvedtgtEndTime":-1
  },
  "EDGE": {
    "id": 2,
    "sourceModule": "Component215",
    "targetModule": "Component210",
    "initialsrcStartTime": 1,
    "initialsrcEndTime": 16,
    "initialtgtStartTime": 0,
    "initialtgtEndTime": 15,
    "resolvedsrcStartTime": -1,
    "resolvedsrcEndTime":-1,
    "resolvedtgtStartTime": -1,
    "resolvedtgtEndTime":-1
  },
  "EDGE": {
    "id": 3,
    "sourceModule": "Component215",
    "targetModule": "Component220",
    "initialsrcStartTime": 1,
    "initialsrcEndTime": 16,
    "initialtgtStartTime": 0,
    "initialtgtEndTime": 15,
    "resolvedsrcStartTime": -1,
    "resolvedsrcEndTime":-1,
    "resolvedtgtStartTime": -1,
    "resolvedtgtEndTime":-1
  },
  "EDGE": {
    "id": 4,
    "sourceModule": "Component210",
    "targetModule": "Component220",
    "initialsrcStartTime": 5,
    "initialsrcEndTime": 20,
    "initialtgtStartTime": 0,
    "initialtgtEndTime": 15,
    "resolvedsrcStartTime": -1,
    "resolvedsrcEndTime":-1,
    "resolvedtgtStartTime": -1,
    "resolvedtgtEndTime":-1
  }
},
"DEPENDENCY": {
  "EdgeList": {
    "firstEdgeIDS": [0],
    "secondEdgeIDS": [2],
    "DeltaTime": 4
  },
  "EdgeList": {
    "firstEdgeIDS": [4],
    "secondEdgeIDS": [3],
    "DeltaTime": 0
```

-continued

```
    }
  }
}
```

In embodiments, DAGs may comprise any number of neural network components connected with any number of edges. FIG. 2 is meant to be illustrative; it is one possible example of a DAG with four neural network components, five edges, and two dependencies and is not meant to limit the disclosure to the particular embodiment described in FIG. 2.

Figure 3:
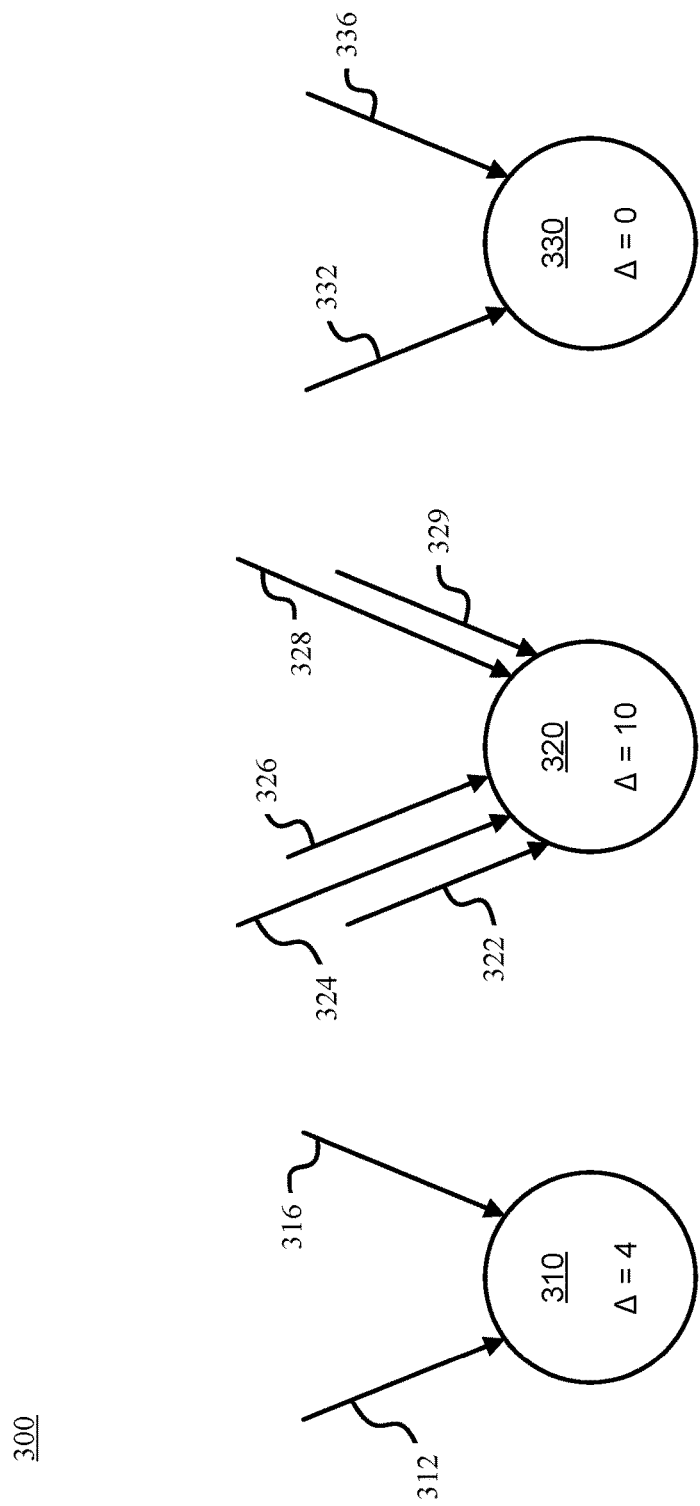
FIG. 3 illustrates a diagram of neural network components and their dependency specifications, in accordance with embodiments of the present disclosure.

Turning now to FIG. 3, illustrated is a diagram 300 of examples of neural network components and their dependency specifications, in accordance with embodiments of the present disclosure. In embodiments, a particular component may have any number of incoming connections (e.g., input edges), and the incoming connections may be grouped into any number of sets. Dependencies among incoming connections may be specified by the component's designer.

In the first example, neural network component 310 illustrates a component with a dependency ($\Delta$=4) between two edges (e.g., edge 312 and edge 316). This dependency specification may specified by the designer of the neural network component, and be represented using code substantially similar to:

```
"DEPENDENCY": {
  "EdgeList": {
    "firstEdgeIDS": [312],
    "secondEdgeIDS": [316],
    "DeltaTime": 4
  }
```

For example, neural network component 320 illustrates a component with a dependency ($\Delta$=10) between two sets of edges (e.g., one set of edges including edge 322, edge 324, and edge 326; and one set of edges including edge 328 and edge 329). This dependency may account for multiple $\Delta$-values (e.g., it may combine the $\Delta$-values among the several incoming edges to arrive at $\Delta$=10) This dependency specification may be represented using code substantially similar to:

```
"DEPENDENCY": {
  "EdgeList": {
    "firstEdgeIDS": [322,324,326],
    "secondEdgeIDS": [328,329],
    "DeltaTime": 10
  }
```

For example, neural network component 330 illustrates a component with synchronization ($\Delta$=0) between two edges (e.g., edge 332 and edge 336). This dependency specification may be represented using code substantially similar to:

```
"DEPENDENCY": {
  "EdgeList": {
    "firstEdgeIDS": [332],
    "secondEdgeIDS": [336],
    "DeltaTime": 0
  }
```

Any configuration of components and edges in a DAG may be used; the examples illustrated in FIG. 3 are demonstrative and are not meant to limit the present disclosure in any way.

Figure 4:
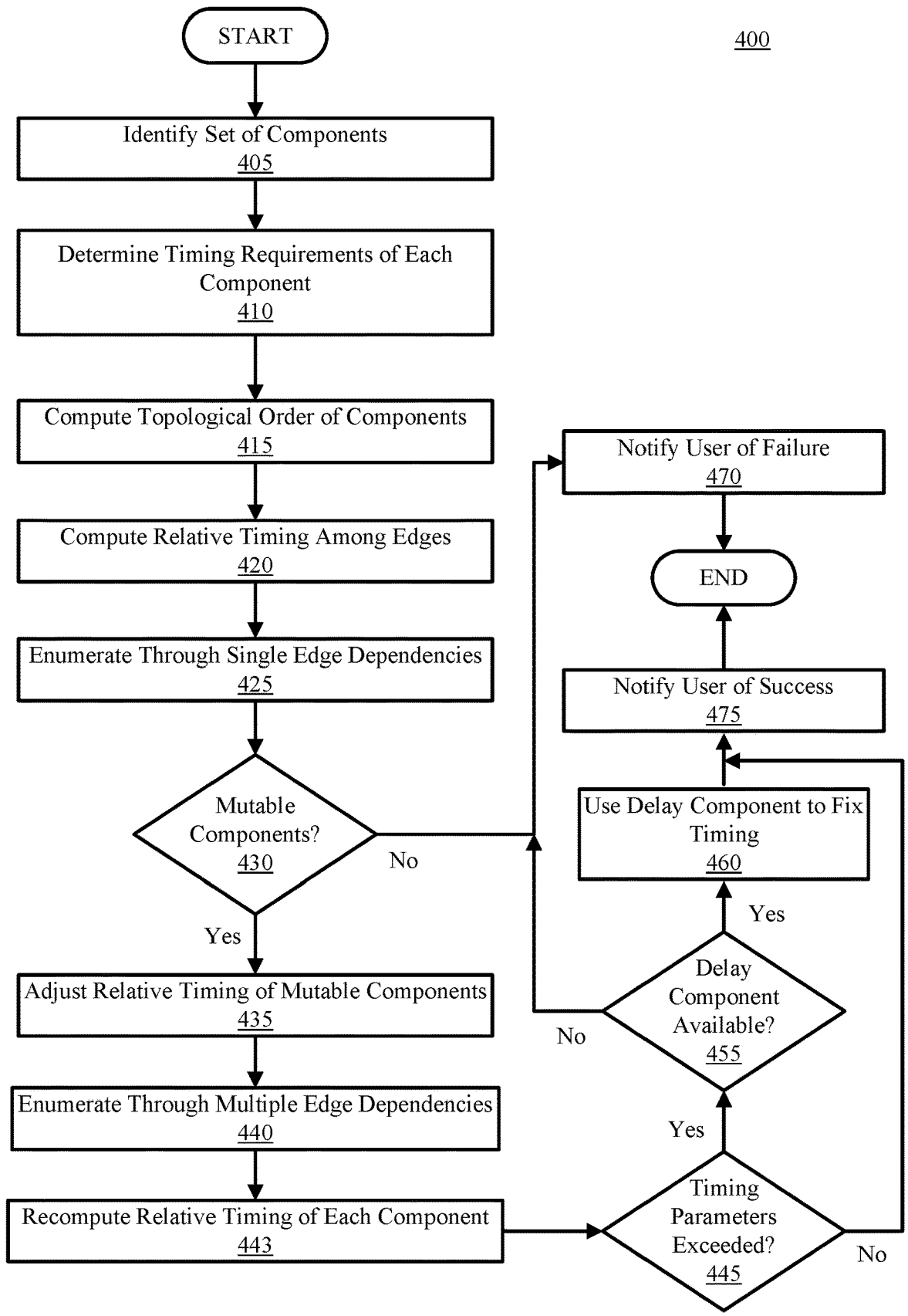
FIG. 4 illustrates a flowchart of a method for resolving timing requirements among components of a neural network, in accordance with embodiments of the present disclosure.

Referring now to FIG. 4, illustrated is a flowchart of a method 400 for resolving timing requirements among components of a neural network, in accordance with embodiments of the present disclosure. At 405, a set of components that are to be included in a neurosynaptic system are identified. A neurosynaptic system may include one or more neural networks that includes one or more neural network components. Neural networks may include arrangements of neural network components (e.g., modules, nodes, corelets, vertices, MLPs, sigmoid neurons, neurosynaptic cores, etc.). In embodiments, each neural network component may further include one or more modules, nodes, corelets, vertices, MLPs, sigmoid neurons, etc. Modules, nodes, corelets, vertices, MLPs, sigmoid neurons, etc. may include an arrangement of logic gates configured to employ machine learning techniques (e.g., backpropagation techniques, learning feedback loops, etc.).

At 410, the timing requirements of each neural network component is determined. Because individual neural network components may be designed by one or more individuals, timing requirements of individual components may be defined by the designers, and therefore may not be known, initially. From the start time and the finish time for the inputs to a neural network component, the start time and finish time for the outputs of a neural network component, and the edge(s) connecting the neural network components, the start/finish time at each edge of a DAG (e.g., for each connection between neural network components that will be included in the overall neurosynaptic system).

At 415, the topological order of the neural network components (e.g., the DAG) is computed using Kahn's Algorithm, which has a complexity of 0(v+e), where v is the total number of vertices (e.g., neural network components) and e is the total number of edges in the graph.

At 420, the relative timing among edges (e.g., the difference/$\Delta$-value of $S_S$, $S_T$, $T_S$, and $T_T$ between edges incident on a single neural network component/vertex) is computed for each source and stored at their respective neural network components. For example, if, at a neural network component A, there are five incoming edges (e.g., two from neural network component B and three from neural network component C), then two sets of $\Delta$-values may be computed (e.g., one set of one $\Delta$-value corresponding to the two edges between neural network components B and A, and one set of two $\Delta$-values corresponding to the three edges between neural network components C and A). In general, for K edges, there will be K−1 $\Delta$-values.

At 425, the method enumerates through the list of single edge dependencies for each neural network component (e.g., each vertex on the DAG). Single edge dependencies may be identified by neural network components with only one element/edge listed in the "firstEdgeIDS" and "secondedgeIDS" fields.

At 430, it is determined whether the neurosynaptic system includes mutable neural network components. Mutable components may be identified with the "mutable": "true" attribute illustrated in the example code above. Mutability may be defined by the designer of a particular neural network component.

If, at 430, it is determined that one or more neural network components is mutable, the relative timing of the mutable components may be adjusted at 435. Adjusting the relative timing of mutable components may include using the difference among source start times, source end times, target start times, and target end times for all of the edges incident on a particular mutable neural network component to adjust, or recompute, the source start time, source end time, target start time, and target end time for all the edges incident on that mutable neural network component. This process may be repeated for each mutable neural network component.

At 440, the method enumerates through the list of multiple edge dependencies for each neural network component (e.g., each vertex on the DAG). Multiple edge dependencies may be identified by neural network components with more than one element/edge listed in either or both of the "firstEdgeIDS" and "secondedgeIDS" fields.

At 443, the relative timing of each neural network component is recomputed. Recomputing the relative timing of each neural network component may include recomputing the source start time, source end time, target start time, and target end time for each neural network component based on the A-values already computed and the dependency requirements of each neural network component.

At 445, it is determined whether timing parameters have been exceeded. This determination may include comparing target start times and target end times to a maximum target start time and a maximum target end time, respectively.

If, at 445, it is determined that one or more timing parameters have been exceeded, it may be determined if one or more delay components (e.g., timing components) are available at 455.

If, at 455, it is determined that no delay components are available, the user is notified of failure at 470. Failure indicates that, for a particular DAG with its particular neural network components, there is no solution to resolve the timing requirements of the neurosynaptic system. In such a case, the design of individual neural network components may be revisited to reconfigure a component's timing dependencies. In embodiments, notifying a user of failure may include a pop-up window on a graphic user interface (GUI), an audible message or alert noise, a tactile vibration of a device, a push notification to the user's personal mobile device, an e-mail notification, text message notification, etc. In embodiments, the failure alert may include information regarding which particular edges and/or components could not be resolved and why.

If, at 455, it is determined that one or more delay components are available, the delay components may be used in an attempt to bring the target start time and/or target end time within the maximum limits at 460.

At 475, the user is notified of success. Success indicates that, for a particular DAG with its particular neural network components, there is at least one solution that resolves the timing requirements of the neurosynaptic system. In embodiments, notifying a user of success may include a pop-up window on a graphic user interface (GUI), an audible message or alert noise, a tactile vibration of a device, a push notification to the user's personal mobile device, an e-mail notification, text message notification, etc.

In embodiments, method 400 may be substantially similar to the following pseudocode:

Method Method for Graph Timing Resolution
Require: Graph G = (V,E) where
    $S_s^j$: start time of processing of inputs for $j^{th}$ component
    $S_f^j$: finish time of processing of inputs for $j^{th}$ component
    $P_j$: processing time (delay) for the $j^{th}$ component
    $M_j$: (Boolean) whether timing can be changed for the $j^{th}$ component
    $D_j$: set of dependency listing for $j^{th}$ component
    $D_j^{single}$ : set of single edge-pair dep listings for $j^{th}$ component
    $D_j^{multiple}$ : set of multiple edge-pair listings for $j^{th}$ component
    $T_s^j$: start time of processing of outputs for $j^{th}$ component
    $T_f^j$: finish time of processing of outputs for $j^{th}$ component
    $d_j^{inp}, d_j^{out}$: input/output degree of the $j^{th}$ component
    $V^{in}(v), V^{out}(v)$ ← list of incoming/outgoing adjacent vertices of v
Procedure: NeuroSynapticTimingResolution
    Step A: Preprocessing Step
    for e ∈ E do
        Combine the $S_s^j, S_f^j, T_s^j, T_f^j$ ∀ e
    end for
    Step B: Topological Order of DAG
        Compute topological ordering of vertices v → $V_{sorted}$.
    Step C: Compute Relative Timing at Vertices
    for v ← 1 to $V_{sorted}$ do
        for $v_{in}$ ← 1 to $V^{in}(v)$ do
            Let $e_{in}$ ∈($v_{in}$, v). Compute Δ($S_s^j$), Δ($S_f^j$), Δ($T_s^j$) and Δ($T_f^j$) for ($V^{in}(v_{in})$ − $d_j^{inp}$) edges relative to edge with minimum $S_s^j$.
        end for
    end for
    Step D: Timing Resolution Step
    for v ← 1 to $V_{sorted}$ do
        for d ← 1 to $D_j^{single}$ do
            if $M_j$ then
                Use d and Δ($S_s^v$), Δ($S_f^v$), Δ($T_s^v$) and Δ($T_f^v$) to recompute $S_s^v, S_f^v, T_s^v$ and $T_f^v$ ∀ $V^{in}(v)$.
            else
                Graph timing cannot be resolved at vertex v
            end if
        end for
        for d ← 1 to $D_j^{multiple}$ do
            if $M_j$ then
                Use d and Δ($S_s^v$), Δ($S_f^v$), Δ($T_s^v$) and Δ($T_f^v$) to recompute $S_s^v, S_f^v, T_s^v$ and $T_f^v$ ∀ $V^{in}(v)$.
                if $T_s^j > T_{smax}^j$ || $T_s^j > T_{fmax}^j$ then
                    if (timing components available) then
                        Use timing components to fix local timing differences.
                    else

```
            Assert if T_smax^j and T_fmax^j are exceeded
        end if
    else
        Graph timing cannot be resolved at vertex v
    end if
  end for
end for
```

Using the pseudocode above to resolve the timing requirements of the example DAG described in FIG. 2, the following example solution file (with relative timing adjustments in bold) may be generated:

```
{
  "EDGES": {
    "EDGE": {
      "id": 0,
      "sourceModule": "Component205",
      "targetModule": "Component210",
      "initialsrcStartTime": 1,
      "initialsrcEndTime": 16,
      "initialtgtStartTime": 4,
      "initialtgtEndTime": 19,
      "resolvedsrcStartTime": 1,
      "resolvedsrcEndTime": 16,
      "resolvedtgtStartTime": 8,
      "resolvedtgtEndTime": 23
    },
    "EDGE": {
      "id": 1,
      "sourceModule": "Component205",
      "targetModule": "Component215",
      "initialsrcStartTime": 1,
      "initialsrcEndTime": 16,
      "initialtgtStartTime": 0,
      "initialtgtEndTime": 15,
      "resolvedsrcStartTime": 1,
      "resolvedsrcEndTime": 16,
      "resolvedtgtStartTime": 2,
      "resolvedtgtEndTime": 17
    },
    "EDGE": {
      "id": 4,
      "sourceModule": "Component210",
      "targetModule": "Component220",
      "initialsrcStartTime": 5,
      "initialsrcEndTime": 20,
      "initialtgtStartTime": 0,
      "initialtgtEndTime": 15,
      "resolvedsrcStartTime": 9,
      "resolvedsrcEndTime": 24,
      "resolvedtgtStartTime": 10,
      "resolvedtgtEndTime": 25
    },
    "EDGE": {
      "id": 2,
      "sourceModule": "Component215",
      "targetModule": "Component210",
      "initialsrcStartTime": 1,
      "initialsrcEndTime": 16,
      "initialtgtStartTime": 0,
      "initialtgtEndTime": 15,
      "resolvedsrcStartTime": 3,
      "resolvedsrcEndTime": 18,
      "resolvedtgtStartTime": 4,
      "resolvedtgtEndTime": 19
    },
    "EDGE": {
      "id": 3,
      "sourceModule": "Component215",
      "targetModule": "Component220",
      "initialsrcStartTime": 1,
      "initialsrcEndTime": 16,
      "initialtgtStartTime": 0,
      "initialtgtEndTime": 15,
      "resolvedsrcStartTime": 3,
      "resolvedsrcEndTime": 18,
      "resolvedtgtStartTime": 10,
      "resolvedtgtEndTime": 25
    }
  }
}
```

The example solution file implies that, in order to resolve the timing requirements of the neurosynaptic system, some of the relative timing values of the neural network components must be adjusted. The only two neural network components with multiple incoming edges are Component 210 and Component 220; therefore, they are the only neural network components that may need their inputs' sources delayed. As described above, Component 210 has a dependency specification of 4 (e.g., Component 210 must receive input along $e_2$ at 4 "ticks" ahead of the input received along $e_0$ to satisfy the dependency). The soonest that Component 210 can receive input along $e_2$ is at the fourth "tick" (one "tick" of processing time at Component 205, plus one "tick" of travel time along $e_1$, plus one "tick" of processing time at Component 215, plus one "tick" of travel time along $e_2$=four "ticks" to arrive at Component 210). Therefore, to satisfy Component 210's dependency specification of 4, the input Component 210 receives along $e_0$ must be received at the eighth "tick." To accomplish this, the output of Component 205 along $e_0$ must be delayed by six "ticks" (eight "ticks" minus one "tick" of processing time at Component 205, minus one "tick" of travel time along $e_0$=six "ticks" of delay needed). Therefore, the solution file above implies that Component 205's output along $e_0$ must be delayed by six "ticks" as part of a timing resolution solution.

Turning to the second neural network component with a dependency, Component 220, it is described above that Component 220 has a dependency of zero. In other words, Component 220 is in sync and requires both inputs to be received simultaneously. The earliest Component 220 can receive input along $e_4$ is at the tenth "tick" (as described above, Component 210 only begins receiving all of its inputs at the eighth "tick," plus one "tick" of processing time at Component 210, plus one "tick" of travel time along $e_4$=10 "ticks" to arrive at Component 220). Therefore, because Component 220 requires synchronization between its two inputs, the input Component 220 receives along $e_3$ must also be received at the tenth "tick." This requires a delay of six "ticks" of Component 215's output along $e_3$ (as described above, the earliest Component 215 can receive input is at the second "tick," plus one tick of processing time at Component 215, plus one tick of travel time along $e_3$, plus six "ticks" of delay=ten "ticks" to arrive at Component 220).

Therefore, the solution file generated above implies that, in order to resolve the timing requirements of the DAG illustrated in FIG. 2, or the neurosynaptic system represented by the DAG in FIG. 2, the relative timing of the output of Component 205 along $e_0$ must be delayed/adjusted by six "ticks," and the relative timing of the output of Component 215 along $e_3$ must also be delayed/adjusted by six "ticks."

In embodiments, a given DAG may have any level of complexity and include any number of neural network components. The above example of the application of the method to the DAG illustrated in FIG. 2 is meant to be demonstrative in nature, and is not meant to limit the disclosure in any way.

Figure 5:
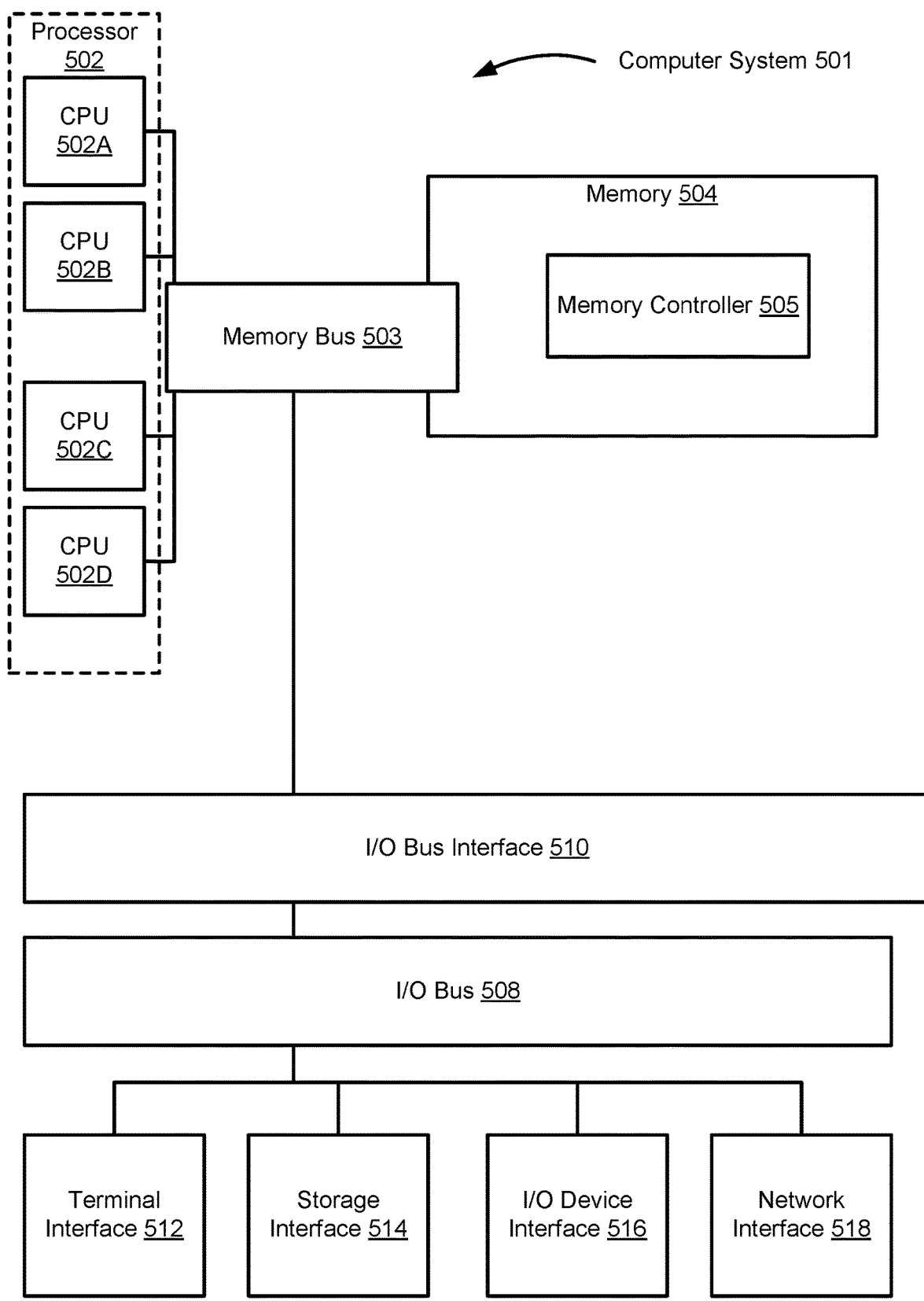
FIG. 5 illustrates a high-level block diagram of an example computer system that may be used in implementing embodiments of the present disclosure.

Referring now to FIG. 5, shown is a high-level block diagram of an example computer system (e.g., computer) 501 that may be configured to perform various aspects of the present disclosure, including, for example, method 400, described in FIG. 4. The example computer system 501 may be used in implementing one or more of the methods or modules, and any related functions or operations, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 514, an I/O (Input/Output) device interface 516, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may comprise one or more levels of on-board cache.

In some embodiments, the memory subsystem 504 may comprise a random-access semiconductor memory, storage device, or storage medium (either volatile or non-volatile) for storing data and programs. In some embodiments, the memory subsystem 504 may represent the entire virtual memory of the computer system 501, and may also include the virtual memory of other computer systems coupled to the computer system 501 or connected via a network. The memory subsystem 504 may be conceptually a single monolithic entity, but, in some embodiments, the memory subsystem 504 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 504 may contain elements for control and flow of memory used by the CPU 502. This may include a memory controller 505.

Although the memory bus 503 is shown in FIG. 5 as a single bus structure providing a direct communication path among the CPUs 502, the memory subsystem 504, and the I/O bus interface 510, the memory bus 503 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, mobile device, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for resolving timing requirements among components of a neurosynaptic system, the method comprising:
    identifying a set of neurosynaptic cores to be included in a neurosynaptic system, wherein each neurosynaptic core in the set of neurosynaptic cores is associated with one or more local inputs and one or more local outputs and wherein the neurosynaptic system adheres to a directed acyclic graph (DAG);
    determining a prespecified timing requirement for each neurosynaptic core, wherein:
        at least some of the neurosynaptic cores have a prespecified relative timing dependency between its respective local inputs; and
        at least some of the neurosynaptic cores are mutable, wherein each mutable neurosynaptic core comprises one or more local inputs and one or more local outputs and wherein the prespecified timing of the one or more local outputs is adjustable relative to a timing of the one or more local inputs;
    computing a topological order for the set of neurosynaptic cores using the DAG;
    computing a relative timing for each neurosynaptic core using the prespecified timing requirements and the DAG;
    enumerating through dependencies of each of the set of neurosynaptic cores in the computed topological order to identify any violated prespecified relative timing dependencies between each component's respective local inputs, and in response:
        identifying at least one of the mutable neurosynaptic cores from the set of neurosynaptic cores; and
        adjusting the relative timing of one or more local outputs relative to one or more local inputs of the identified at least one of the mutable neurosynaptic cores to resolve the violated prespecified relative timing dependencies.

2. The method of claim 1, wherein the dependencies of the set of neurosynaptic cores include a first neurosynaptic core requiring a computational input from two or more other neurosynaptic cores in the set of neurosynaptic cores; and wherein adjusting the relative timing of one or more mutable neurosynaptic cores further comprises recomputing target start times and target end times based on the relative timing and dependencies for each neurosynaptic core in the set of neurosynaptic cores.

3. The method of claim 2, further comprising:
determining, based on the relative timing required to resolve the timing requirements of each neural network component in the set of neurosynaptic cores, that the required relative timing parameters of one or more neurosynaptic cores exceed a maximum relative timing restriction; and
using one or more delay components among the set of neurosynaptic cores to resolve the maximum relative timing restriction, the dependencies, and the timing requirements of each neurosynaptic core.

4. The method of claim 3, wherein using one or more delay components cannot resolve the maximum relative timing restrictions, the dependencies, and the timing requirements of each component in the set of neurosynaptic cores, the method further comprising notifying a user that the timing requirements of the set of components cannot be resolved.

5. The method of claim 1, wherein the topological order of the set of neurosynaptic cores is determined using Kahn's Algorithm.

6. The method of claim 1, wherein the neurosynaptic cores each comprise an arrangement of logic gates.

7. A system for resolving timing requirements among components of a neurosynaptic system, the system comprising:
a memory with program instructions stored thereon; and
a processor in communication with the memory, wherein the system is configured to perform a method, the method comprising:
identifying a set of neurosynaptic cores to be included in a neurosynaptic system, wherein each neurosynaptic core in the set of neurosynaptic cores is associated with one or more local inputs and one or more local outputs and wherein the neurosynaptic system adheres to a directed acyclic graph (DAG);
determining a prespecified timing requirement for each neurosynaptic core, wherein:
at least some of the neurosynaptic cores have a prespecified relative timing dependency between its respective local inputs; and
at least some of the neurosynaptic cores are mutable, wherein each mutable neurosynaptic core comprises one or more local inputs and one or more local outputs and wherein the prespecified timing of the one or more local outputs is adjustable relative to a timing of the one or more local inputs;
computing a topological order for the set of neurosynaptic cores using the DAG;
computing a relative timing for each neurosynaptic core using the prespecified timing requirements and the DAG;
enumerating through dependencies of each of the set of neurosynaptic cores in the computed topological order to identify any violated prespecified relative timing dependencies between each component's respective local inputs, and in response:
identifying at least one of the mutable neurosynaptic cores from the set of neurosynaptic cores; and
adjusting the relative timing of one or more local outputs relative to one or more local inputs of the identified at least one of the mutable neurosynaptic cores to resolve the violated prespecified relative timing dependencies.

8. The system of claim 7, wherein the dependencies of the set of neurosynaptic cores include a first neurosynaptic core requiring a computational input from two or more other neurosynaptic cores in the set of neurosynaptic cores; and wherein adjusting the relative timing of one or more mutable neurosynaptic cores further comprises recomputing target start times and target end times based on the relative timing and dependencies for each neurosynaptic core in the set of neurosynaptic cores.

9. The system of claim 8, the method further comprising:
determining, based on the relative timing required to resolve the timing requirements of each neural network component in the set of neurosynaptic cores, that the required relative timing parameters of one or more neurosynaptic cores exceed a maximum relative timing restriction; and
using one or more delay components among the set of neurosynaptic cores to resolve the maximum relative timing restriction, the dependencies, and the timing requirements of each neurosynaptic core.

10. The system of claim 9, wherein using one or more delay components cannot resolve the maximum relative timing restrictions, the dependencies, and the timing requirements of each component in the set of neurosynaptic cores, the method further comprising notifying a user that the timing requirements of the set of components cannot be resolved.

11. The system of claim 7, wherein the topological order of the set of neurosynaptic cores is determined using Kahn's Algorithm.

12. The system of claim 7, wherein the neurosynaptic cores each comprise an arrangement of logic gates.

13. A computer program product for resolving timing requirements among components of a neurosynaptic system, the computer program product comprising a computer readable storage medium having program instructions embodied therewith, the program instructions executable by a device to cause the device to:
identify a set of neurosynaptic cores to be included in a neurosynaptic system, wherein each neurosynaptic core in the set of neurosynaptic cores is associated with one or more local inputs and one or more local outputs and wherein the neurosynaptic system adheres to a directed acyclic graph (DAG);
determine a prespecified timing requirement for each neurosynaptic core, wherein:
at least some of the neurosynaptic cores have a prespecified relative timing dependency between its respective local inputs; and
at least some of the neurosynaptic cores are mutable, wherein each mutable neurosynaptic core comprises one or more local inputs and one or more local outputs and wherein the prespecified timing of the one or more local outputs is adjustable relative to a timing of the one or more local inputs;
compute a topological order for the set of neurosynaptic cores using the DAG;

compute a relative timing for each neurosynaptic core using the prespecified timing requirements and the DAG;

enumerate through dependencies of each of the set of neurosynaptic cores in the computed topological order to identify any violated prespecified relative timing dependencies between each component's respective local inputs, and in response:

identifying at least one of the mutable neurosynaptic cores from the set of neurosynaptic cores; and adjusting the relative timing of one or more local outputs relative to one or more local inputs of the identified at least one of the mutable neurosynaptic cores to resolve the violated prespecified relative timing dependencies.

14. The computer program product of claim 13, wherein the dependencies of the set of neurosynaptic cores include a first neurosynaptic core requiring a computational input from two or more other neurosynaptic cores in the set of neurosynaptic cores; and wherein adjusting the relative timing of one or more mutable neurosynaptic cores further comprises recomputing target start times and target end times based on the relative timing and dependencies for each neurosynaptic core in the set of neurosynaptic cores.

15. The computer program product of claim 14, wherein the program instructions further cause the device to:

determine, based on the relative timing required to resolve the timing requirements of each neural network component in the set of neurosynaptic cores, that the required relative timing parameters of one or more neurosynaptic cores exceed a maximum relative timing restriction; and use one or more delay components among the set of neurosynaptic cores to resolve the maximum relative timing restriction, the dependencies, and the timing requirements of each neurosynaptic core.

16. The computer program product of claim 15, wherein using one or more delay components cannot resolve the maximum relative timing restrictions, the dependencies, and the timing requirements of each component in the set of neurosynaptic cores, the program instructions further cause the device to notify a user that the timing requirements of the set of components cannot be resolved.

17. The computer program product of claim 13, wherein the topological order of the set of neurosynaptic cores is determined using Kahn's Algorithm.

18. The method of claim 6, wherein each neurosynaptic core is chosen from the group consisting of modules, nodes, multi-layer perceptrons (MLPs), sigmoid neurons, cores, and corelets.

19. The method of claim 1, wherein the relative timing dependency between the respective local inputs are greater than zero.

20. The method of claim 19, wherein at least one of the relative timing dependencies comprises a multiple relative timing dependency between three or more local inputs.

* * * * *